S. S. BLEVINS.
RUNNING GEAR FOR MOTOR VEHICLES.
APPLICATION FILED MAR. 27, 1914.
1,172,866.
Patented Feb. 22, 1916.
2 SHEETS—SHEET 2.
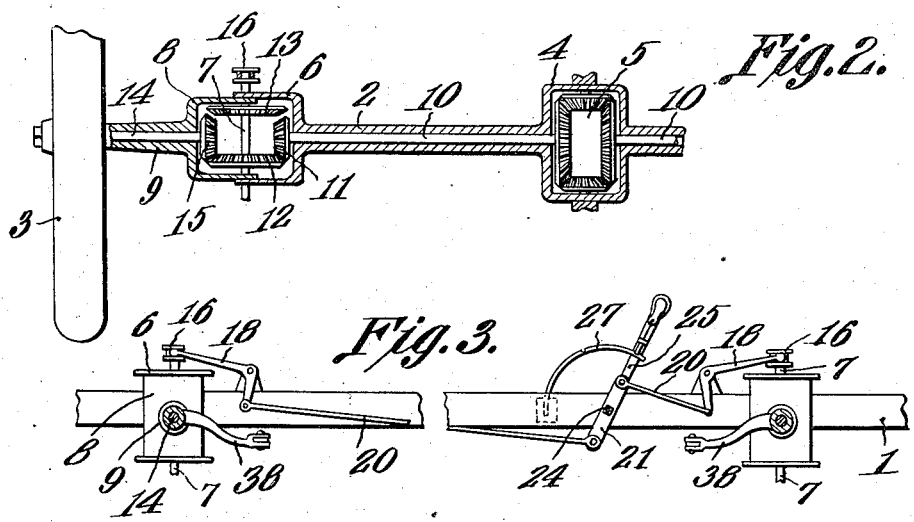
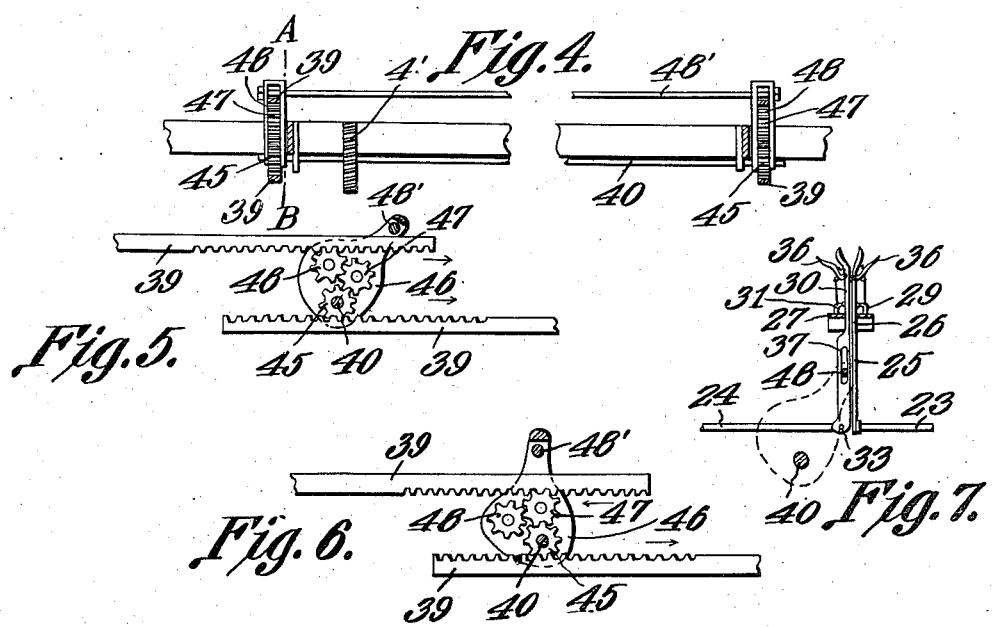
Witnesses
S. S. Blevins,
Inventor
by C. A. Snow & Co.
Attorneys

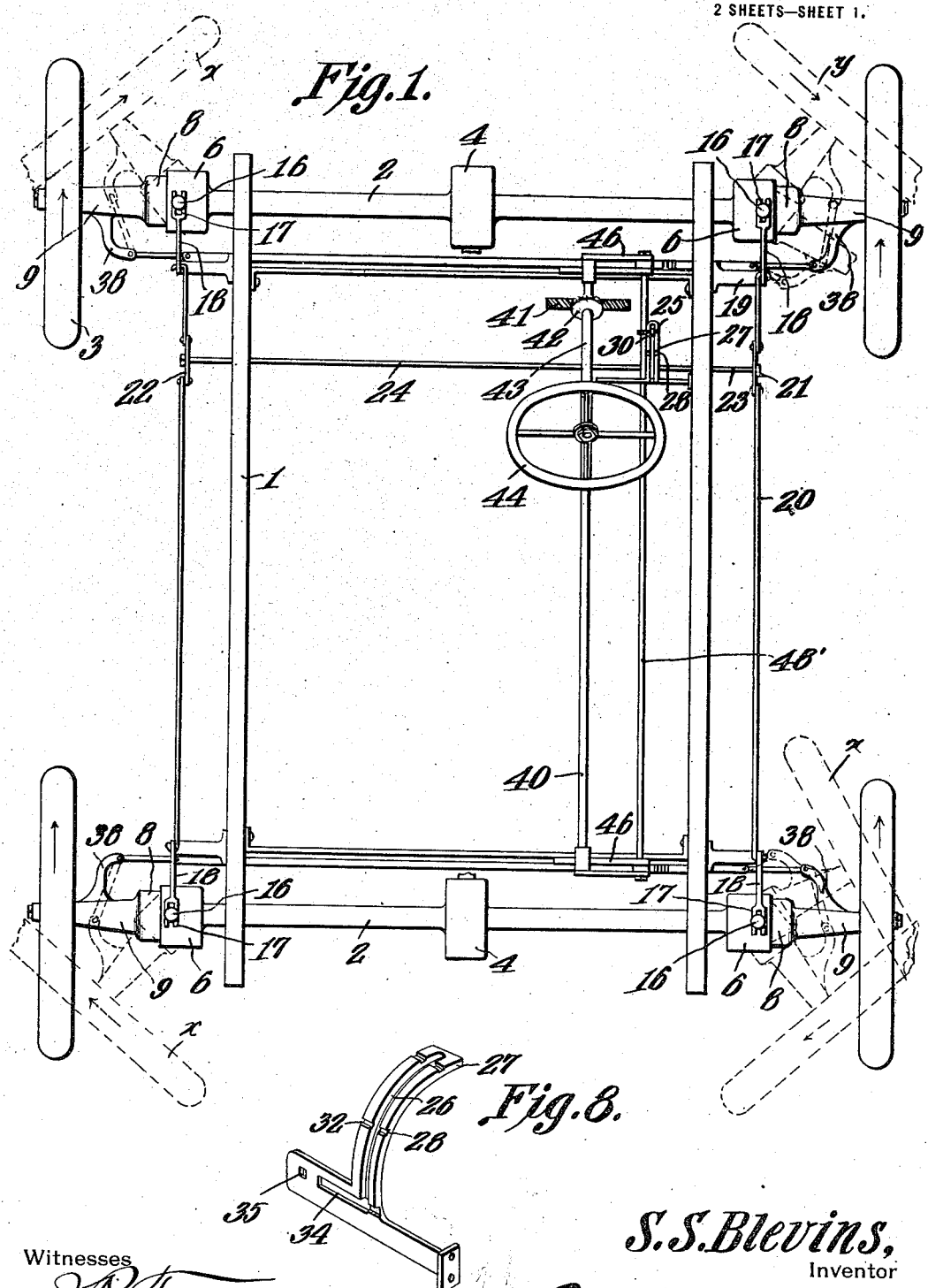

UNITED STATES PATENT OFFICE.

STPHEN SIGLE BLEVINS, OF HOUSTON, TEXAS, ASSIGNOR OF ONE-HALF TO EDWARD J. McMAHON, OF HOUSTON, TEXAS.

RUNNING-GEAR FOR MOTOR-VEHICLES.

1,172,866.  Specification of Letters Patent.  Patented Feb. 22, 1916.

Application filed March 27, 1914. Serial No. 827,742.

*To all whom it may concern:*

Be it known that I, STPHEN SIGLE BLEVINS, a citizen of the United States, residing at Houston, in the county of Harris and State of Texas, have invented a new and useful Running-Gear for Motor-Vehicles, of which the following is a specification.

This invention relates to running gears for motor vehicles and one of its objects is to provide a structure of this character in which all of the wheels constitute steering wheels and in which each wheel constitutes a driving wheel.

A further object is to provide reversing mechanism whereby all of the wheels can be driven in the same direction either forwardly or rearwardly or whereby the wheels at one side of the vehicle can be rotated in one direction while the wheels at the other side of the vehicle are being rotated in the opposite direction.

A further object is to provide means under the control of the steering wheel whereby the axes of rotation of the wheels can be shifted relative to each other so as to radiate from a common point in the vehicle body whereby, when the wheels at one side of the vehicle are driven in one direction and those at the other side of the vehicle are driven in the opposite direction, said vehicle will be caused to revolve within its own length.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of the running gear of a motor vehicle having the present improvements combined therewith, the positions to which the wheels may be shifted relative to the chassis of the vehicle being indicated both by full and dotted lines. Fig. 2 is a vertical longitudinal section through a portion of one of the axles. Fig. 3 is a side elevation of a portion of the chassis, the wheel carrying spindles being shown in section. Fig. 4 is a longitudinal section through a portion of the machine and showing the actuating shaft of the steering mechanism and the gear carrying frames mounted thereon. Fig. 5 is an enlarged section on line A—B, Fig. 4, the gears and ratchets being positioned to turn the wheels on one axle together in the same direction for steering purposes. Fig. 6 is a view similar to Fig. 5 and showing the parts adjusted to simultaneously move the wheels on an axle in opposite directions for use in revolving a vehicle about its own center. Fig. 7 is a transverse section through a portion of the machine and showing the controlling levers and their shafts. Fig 8 is a detail view of the locking segment used in connection with the levers.

Referring to the figures by characters of reference 1 designates the frame or chassis of a motor vehicle, the same being supported by a tubular axle 2 at each end thereof and which axle, in turn, is supported by the combined steering and driving wheels 3. Each tubular axle 2 includes a casing 4 for the differential gearing shown generally at 5 in Fig. 2 and at each end of each axle is a yoke 6 through which extends a vertically slidable shaft 7 which serves to pivotally connect the yoke 6 to another yoke 8 formed at the inner end of a tubular spindle 9. The differential gearing 5 serves as a connection between the two shafts 10 arranged within the axle 2, the outer end of each of these shafts 10 being provided with a gear 11 or the like extending between opposed gears 12 and 13 arranged below and above the gear 11 respectively and secured to and movable with the shaft 7. A short shaft 14 is journaled within the spindle 9 and connected to the inner end of this shaft is a gear 15 disposed between the gears 12 and 13 and corresponding with the gear 11. The outer end of each shaft 14 is connected to the hub of a wheel 3.

An annularly grooved collar 16 is secured to the upper end of each shaft 7 and each of these collars is loosely engaged by the forked end 17 of a bell crank lever 18, said lever being mounted in any suitable manner, as upon a bracket 19 extending from the chassis 1. One arm of each bell crank lever 18 is extended downwardly and these downwardly extending arms of the bell crank levers at one side of the chassis are connected, by rods 20, to the ends of a lever 21, similar rods 20 serving to connect the downwardly extending arms of the bell crank levers at the other side of the chassis to another lever 22. Lever 21 is secured at its center to the outer end of a shaft 23 while lever 22 is secured to the outer end of a shaft 24, these two shafts alining and being extended transversely within the chassis.

The inner ends of the shafts are brought close together and shaft 23 is provided, at its inner end, with an actuating lever 25 fixedly connected thereto and extending upwardly through a slot 26 formed in an arcuate locking plate 27 which is concentric with the shafts 23 and 24 and may be supported by the chassis in any suitable manner. The plate 27 is provided with notches 28 adapted to be engaged by a locking dog 29 carried by lever 25 so that the said lever can be securely held in any one of three positions. Another actuating lever 30 is mounted within the slot 26 at one side of lever 25 and likewise carries a locking dog 31 adapted to be seated within any one of a set of notches 32 corresponding with the notches 28. This lever 30 is pivotally connected to the inner end of shaft 24, as shown at 33 so that while the lever when shifted longitudinally of the slot 26, will rotate shaft 24, it can be swung laterally into a slot extension 34 formed at one end of the slot 26, this lateral swinging movement being independent of the shaft 24. A notch 35 may be provided at the end of the slot extension 34 for the reception of the dog 31 so that lever 30 can be held in this laterally shifted position. Each of the dogs 29 and 31 has means, in the form of a spring pressed lever 36, for lifting it out of engaging position and the said levers 36 are so positioned that both of them as well as the upper ends of both levers can be gripped in one hand and the two levers simultaneously released and shifted. Thus the two shafts 23 and 24 can be rotated together in either direction. By grasping only one of the levers, however, the shaft connected thereto can be shifted independently of the other shaft. It will be seen that the lever 30 is formed with an elongated longitudinal slot 37. This slot is for the purpose hereinafter set forth.

Extending from the spindle 9 of each axle are arms 38 each of which has a rack bar 39 pivotally connected thereto. The rack bars of the two arms on each axle are extended toward each other and disposed in lapped relation, one rack being arranged directly over the other rack, as shown in Figs. 5 and 6. A longitudinal shaft 40 is journaled in the chassis and the ends of this shaft extend between the upper and lower racks 39 at each end of the machine. This shaft 40 has a worm gear 41 secured to it and engaged by a worm 42 connected to the steering post 43 which, in turn, is adapted to be rotated by an ordinary hand or steering wheel 44.

Secured to shaft 40 adjacent each end is a gear 45, these gears meshing constantly with the lower racks 39 at the respective ends of the machine. Pivotally mounted on the shaft 40 adjacent each end thereof is a frame 46, this frame straddling the two racks 39 and carrying meshing gears 47 and 48. Gears 47 are constantly in mesh with gears 45. The two frames 46 may be connected in any suitable manner, as by means of a stiff rod 48' extending longitudinally of the machine and loosely through the slot 37 in lever 30. As shown in Figs. 5 and 6, this rod 48' is arranged at points remote from the shaft 40 and extends over the upper racks 39. It is to be understood that the differential gearing 5 may be actuated in any suitable manner for the purpose of rotating the shaft 10.

When it is desired to drive the machine forward, the two levers 25 and 30 are released from the locking plate and shifted against one end of the slot 26. This will result in the simultaneous rotation of the two shafts 23 and 24 and, consequently, the rotation of the levers 21 and 22. Consequently the rods 20 will be actuated to push against the depending arms of the bell crank levers 18 so that the forked ends of the levers will be elevated, thus lifting the shafts 7 simultaneously and bringing the gears 12 into mesh with the gears 11 and 15. When the levers are in this position, the upper end of the slot 37 in lever 30 will bear downwardly on the rod 48', thus holding the rod against upward movement and maintaining gears 48 in mesh with the upper racks 39. Consequently, when the steering wheel 44 is rotated, motion will be transmitted through the worms 42 and 41 to shaft 40 and from this shaft through the gears 45, 47 and 48 to the upper racks 39. Gears 45 will operate to shift the lower racks 39 in one direction while the gears 48 will operate to shift the upper racks 39 in the same direction. This will be apparent by referring to Fig. 5. Consequently, this actuation of shaft 40 will result in swinging the spindles 9 simultaneously about the shafts 7, these spindles being turned to the positions indicated at X in Fig. 1, if it is desired to turn to the right. It is to be understood of course when it is desired to turn to the left, the movement of the spindles will be reversed. Should it be desired to reverse the movement of the vehicle, it is merely necessary to shift levers 25 and 30 against the opposite end of the slot 26 so that the shafts 7 will thus be simultaneously moved downwardly to bring the gears 13 into mesh with gears 11 and 15. When lever 30 is brought to this last position, the locking dog 31 will extend into the slot extension 34, thus holding lever 30 against movement back toward its initial position. With the parts in this position, should it be desired to rotate the vehicle about its own center, it is first necessary to shift lever 30 laterally until its dog 31 can be seated in the notch 35. This lateral movement of the lever 30 relative to its shaft 24, will result in pushing the rod 48' upwardly and laterally and, consequently, the frames 46 will be swung about the shaft 40, thereby disengaging gears 48 from the racks 39 and bringing gears 47 into engagement with the upper racks 39. Obviously, therefore, when shaft 40 is rotated by means of wheel 44 and the gears controlled thereby, gears 45 will shift the lower racks 39 in one direction while gears 47 will shift the upper racks 39 in the opposite direction, as shown in Fig. 6. Consequently the wheels at the left side of the machine can be shifted to the position indicated at X in Fig. 1 while the wheels at the right side of the machine can be shifted to the positions indicated at Y in Fig. 1. Thus the axes of rotation of the wheels will radiate from a central point in the car body. By now shifting lever 25 against that end of the slot 26 remote from the extension 34, it will be seen that the gears 12 at the right side of the machine will be lifted into engagement with the gears 11 and 15 adjacent thereto while the gears 13 at the left side of the machine will remain in engagement with the adjacent gears 11 and 15. Consequently when the shafts 10 are rotated, all of the wheels will be rotated so as to cause the machine to revolve about its own center, it thus being possible to readily rotate the machine within its own length. It will be understood of course that in order to get this action it is necessary to swing the spindles 9 through 45 degrees from their normal positions, as shown in Fig. 1.

It is to be understood that I do not restrict myself to the particular means shown and described for shifting the gears 47 and 48 or for actuating the shafts 23 and 24, it being understood that any suitable means other than that disclosed may be employed for this purpose.

What is claimed is:—

1. A motor vehicle including front and rear wheels mounted to swing about individual vertical axes, reversible power transmitting mechanism for each wheel, and means for shifting said mechanisms to rotate the front wheels in either the same or different directions and to rotate the rear wheels in either the same or different directions.

2. A motor vehicle including front and rear wheels mounted to swing about individual vertical axes, reversible power transmitting mechanism for each wheel, means for shifting said mechanisms to rotate the front wheels in either the same or different directions and to rotate the rear wheels in either the same or different directions, steering mechanism, and means controlled by said shifting means for adjusting the steering mechanism to swing the front and rear wheels simultaneously into position either to guide the vehicle during the rotation of the wheels, or to revolve the vehicle about its center during such rotation of the wheels.

3. A motor vehicle including front and rear wheels mounted to swing about individual vertical axes, reversible power transmitting mechanism for each wheel, means for shifting said mechanisms to rotate the front wheels in either the same or different directions and to rotate the rear wheels in either the same or different directions, steering mechanism, and means controlled by said shifting means when moved to rotate the wheels in different directions, for adjusting said steering mechanism to swing the front and rear wheels into position to revolve the vehicle about its center during the rotation of the wheels.

4. The combination with the front and rear axles of a motor vehicle, alining shafts in each axle, wheels carried by certain of the shafts, gears carried by the shafts, and vertically movable reversing gears interposed between the first named gears, of means for simultaneously raising and lowering the reversing gears at one side of the vehicle, means for simultaneously raising and lowering the reversing gears at the other side of the vehicle, said means being operable together or independently, steering mechanism, and means actuated by one of said first named means for adjusting the steering mechanism to swing the front and rear wheels simultaneously into position to revolve the vehicle about its center during the rotation of the wheels at the two sides of the machine in opposite directions respectively.

5. In a motor vehicle, the combination with front and rear axles, spindles mounted to swing relative thereto about vertical axes, reversible driving mechanism within each axle and spindles, and wheels upon the spindles and driven by said mechanism, of arms extending from the spindles, a rack connected to each arm, the racks extending toward one side of the machine being lapped by the racks extending toward the opposite side of the machine, a longitudinal shaft, gears thereon meshing with one of the racks at each end of the vehicle, frames pivotally mounted upon the shaft, a pair of meshing gears within each frame, one gear of each pair meshing with one of the first mentioned gears on the shaft, and means for shifting the frames simultaneously to bring either gear of each pair into mesh with one of the racks thereby to move the racks at each end of the vehicle in either the same or in opposite directions as desired.

6. The combination in a motor vehicle, of means for swinging the front wheels of the vehicle toward each other about individual axes to position the bearings of the wheels along lines radiating from the center of the vehicle, and for swinging the rear wheels about individual axes to position their bearings along lines converging toward the center of the vehicle, and means for simultaneously rotating all of the wheels to revolve the vehicle about the center of the body thereof.

In testimony that I claim the foregoing as my own, I have hereto affixed my signature in the presence of two witnesses.

STPHEN SIGLE BLEVINS.

Witnesses:
B. W. WARD,
JAS. L. AUBRY.

Copies of this patent may be obtained for five cents each, by addressing the "Commissioner of Patents, Washington, D. C."